United States Patent Office 3,539,380
Patented Nov. 10, 1970

3,539,380
METHYLCELLULOSE AND POLYALKYLENE GLYCOL COATING OF SOLID MEDICINAL DOSAGE FORMS
Richard H. Johnson, Kalamazoo, Mich., assignor to The Upjohn Company, Kalamazoo, Mich., a corporation of Delaware
No Drawing. Continuation of application Ser. No. 324,229, Nov. 18, 1963, which is a continuation-in-part of application Ser. No. 62,860, Oct. 17, 1960. This application Jan. 8, 1968, Ser. No. 696,150
Int. Cl. A61k 9/00
U.S. Cl. 117—100    2 Claims

ABSTRACT OF THE DISCLOSURE

A process for film coating tablets and the like by applying a solution of methylcellulose and polyalkylene glycol in a volatile solvent. Application by rotating coating pans or air suspension method to provide a homogeneous pliable film coat of less than 10 mils thickness consisting essentially of methylcellulose and polyalkylene glycol having characteristics of rapid disintegration and resistance to heat and humidity.

CROSS REFERENCE TO RELATED APPLICATIONS

This application is a continuation of application Ser. No. 324,229 filed Nov. 18, 1963, now abandoned, which in turn is a continuation-in-part of application Ser. No. 62,860, filed Oct. 17, 1960, now abandoned.

BRIEF SUMMARY OF INVENTION

This invention relates to film coatings, the coating process, and film coated substances, primarily medicinals. More particularly, this invention relates to film coating with coating compositions which are solutions consisting essentially of methylcellulose and a polyalkylene glycol; the process of applying such compositions; and solid substances, medicinals, usually medicinal tablets, which have been coated with the said compositions.

DETAILED DESCRIPTION

It is well known in the art of pharmaceutical manufacturing to provide solid medicinal dosage forms, in most instances tablets, with a protective coating. The coating can serve to protect the dosage form from moisture, reduce wear and chipping during handling and shipping, disguise unpleasant tastes and odors and otherwise enhance the pharmaceutical elegance.

To overcome the difficulties encountered with sugar coating, namely the requirement for a multiplicity of applications of coating composition which is a time-consuming operation demanding a high degree of skill by the operator and resulting in a thick coating, a new group of materials have been introduced and are known generically as film-formers. Many compositions containing film-formers have been introduced for coating purposes, however, there have been various disadvantages connected with the use of the coatings presently available. The film-coatings have been susceptible to hot and/or humid atmospheres which resulted in the premature disintegration of the coating, or, to a lesser degree, the sticking together of tablets and mottling of the coating surface. The coatings have been brittle and subject to fracture or crazing and have been subject to changes upon ageing such as color change and change in disintegration time. Further, the application of the film-forming coating compositions has resulted in lack of uniform deposition of coating about the edges of the tablet.

According to the present invention, it has been found that coating compositions consisting essentially of a solution of methycellulose and a polyalkylene glycol having an average molecular weight of from about 200 to about 9000 can be applied to solid medicinal dosage forms to form a coating having superior properties. In addition, the coating compositions can contain minor amounts of adjuvants such as coloring agents, flavoring agents, and sweetening agents. Active drugs can be dissolved or suspended in the coating fluid and added to the coat. Such coating compositions also have utility in non-pharmaceutical applications, for example, the food and agricultural chemical fields.

The coating compositions of the present invention have all of the advantages common to prior art film coatings, namely protection from chipping and breaking, masking of disagreeable taste and odor and providing a colored and attractive surface. The unobvious compositions of the present invention also unexpectedly provide additional advantages. For example, the film-coating is extremely thin, e.g., less than 10 mils, and yet capable of adequate protection. Such a thin coating requires less labor and material in its application and does not appreciably increase the size of the tablet and does not obliterate embossing, scoring, or imprinting. In spite of its thinness the film-coating does not disintegrate prematurely, stick together or mottle in the presence of hot and/or humid atmosphere. Additionally the film-coating process in eliminating the need for a sealing coat (e.g., shellac coat) or final polishing coat and, being soluble in volatile anhydrous solvents, is particularly advantageous for coating water sensitive dosage forms. Further, the film-coating of the present invention is uniformly deposited over the surface of the tablet and remains pliable and capable of withstanding shock or ageing. In addition, ageing does not discolor or unduly alter its rapid disintegration.

The principal film-forming ingredient is methylcellulose. As used in the specification and claims the term methylcellulose is used to mean the methyl ether of cellulose containing from about 24% to about 32% of methoxy ($-O-CH_3$) groups; additionally, the term is used to include the cellulose derivatives which, in addition to the aforementioned methoxy groups, also contain from about 4% to about 12% of 2-hydroxypropoxyl groups. The methylcellulose is commercially available in a number of forms which differ in the degree of etherification. These forms are marketed with regard to the viscosity imparted to aqueous solutions. The low viscosity forms are preferred as it is possible to prepare coating solutions with a higher concentration of film-forming solids which permits the formation of a coating more quickly and with economy of solvents. The methylcellulose can be from about 50 to about 95% w./w. of the coating with from about 75 to 85% w./w. being preferred.

The other principal ingredient is a polyalkylene glycol. Suitable are the polyalkylene glycols such as polyethylene, glycol and polypropylene glycol having an average molecular weight of from 200 to 9000. The concentration can be from about 5 to about 50% w./w. of the coating. Preferred is polyethylene glycol in a preferred concentration of from about 5 to about 25% w./w.

Additional minor ingredients in the coating can include adjuvants as coloring agents such as the non-toxic dyes, pigments and likes which have been certified for use in the food, drug and cosmetic industry; flavoring agents to impart a pleasant taste, such as peppermint oil, oil of wintergreen, licorice and spearmint; sweetening agents such as cyclamate and saccharin; and opacifiers such as titanium dioxide and ferric oxide (Indiana Red Oxide). Also reodorants such as vanilla and citrus to give a pleasant odor can be included.

The compositions are prepared by dissolving the methylcellulose and polyethylene glycol in a suitable volatile solvent, or preferably in a system of two or more miscible co-solvents. In the preferred solvent system, a solution of chloroform, methanol and water is used in a ratio by weight of 55 parts chloroform, 35 parts methanol and 10 parts of water. The water can be omitted from the foregoing solvent system wherein water-sensitive tablets are to be coated. Additional suitable volatile solvents which can be used include methylene chloride, ethylene dichloride, ethanol, isopropanol, butanol ond formamide.

The coating solutions are particularly advantageous for use in the air suspension coating machines, such as illustrated by Wurster in U.S. Pat. No. 2,799,241 and in the J. A. Ph. A., Scientific Edition, August 1959, at page 451. By use of the air suspension machine, tablets or other solid susbstances (e.g., small particles and granules) are suspended and tumbled in a current of air with the coating composition being blown into the system. The compositions of the present invention have a particular advantage for use in this system in that the rotating substances do not stick together during the coating process.

The coatings can also be applied using conventional coating apparatus and procedure. For example, tablets can be placed in a standard rotating coating pan and the coating composition can be sprayed onto the tablets or poured over the tumbling tablets from a ladle. Applications of the coating composition can be made from time to time. Removal of the volatile solvents can be facilitated by means of a current of warm air being blown into the pan.

The following examples are illustrative of the processes and products of this invention and are not to be construed as limiting.

EXAMPLE 1

Eighty-eight grams of methylcellulose U.S.P., 10 cps., is wetted with 845 gm. of absolute methanol. Sufficient chloroform is added to make 2200 gm. and stirred until the methylcellulose dissolves. Twenty-two gm. of polyethylene glycol 1000 is added together with about ½ gm. each of F. D. and C. Yellow No. 5 and No. 6. The solution is filtered through cheesecloth.

A coating solution so prepared was applied to 2000 gm. of tablets. The tablets were 7/16" oval weighing 0.605 gm. each. The tablets were placed in an air suspension machine and coated with about 2150 gm. of the filtrate obtained above.

The following results were obtained:

Coating per tablet _____ mg__ 30.4
Thickness:
    Edge _____ mils__ 3.15
    Side _____ do____ 3.60

Disintegration time: U.S.P. XV
    Coated tablets _____ minutes__ 10
    Uncoated tablets _____ do____ 4

Difference due to film _____ do____ 6

EXAMPLE 2

Following the procedure of Example 1 a coating solution is similarly prepared substituting 11 gm. of polyethylene glycol 400 and 11 gm. of polyethylene glycol 4000 for the 22 gm. of polyethylene glycol 1000 of the example.

This coating solution was applied to tablets similar to those of Example 1 by means of the air suspension machine.

The following results were obtained:

Coating per tablet _____ mg__ 27.0
Thickness:
    Edge _____ mils__ 3.1
    Side _____ do____ 4.2

Disintegration time: U.S.P. XV
    Coated tablets _____ minutes__ 11
    Uncoated tablets _____ do____ 4

Difference due to film _____ do____ 7

EXAMPLE 3

Following the procedure of Example 1, a coating solution is similarly prepared substituting 22 gm. of polyethylene glycol 1500 for the polyethylene glycol 1000 of the example.

This coating solution was applied to tablets similar to those of Example 1 by means of the air suspension machine.

The following results were obtained:

Coating per tablet _____ mg__ 31.1
Thickness:
    Edge _____ mils__ 4.0
    Side _____ do____ 3.45

Disintegration time: U.S.P. XV
    Coated tablets _____ minutes__ 10
    Uncoated tablets _____ do____ 4

Difference due to film _____ do____ 6

EXAMPLE 4

One hundred sixty grams of a methylcellulose having 28–30% methoxyl and 7–12 % hydroxypropoxyl groups are wetted with 400 cc. of anhydrous 3A alcohol. To this is added 100 gm. of polyethylene glycol 400 and sufficient chloroform to make 4000 cc. 1 gm. each of imitation custard flavor, F. D. and C. Yellow No. 5, and F. D. and C. Yellow No. 6 are then added to the solution.

To this 600 cc. of the solution 600 cc. of chloroform and 300 cc. of anhydrous 3A alcohol are added.

Twenty-nine hundred cc. of this coating fluid was applied to 2500 gm. of ⅜" half oval tablets. Each tablet weighs 414 mg. The coating was applied in the air suspension machine and the following results were obtained:

Coating per tablet _____ mg__ 17.3
Disintegration Time: U.S.P. XV
    Coated tablet _____ minutes__ 6
    Uncoated tablet _____ do____ 4

Difference due to film _____ do____ 2

EXAMPLE 5

Fifty-four gm. of methylcellulose U.S.P., 10 cps., and 54 gm. of methylcellulose having 28–30% methxyl and 7–12% hydroxypropoxyl groups are wetted with 540 gm. of anhydrous 3A alcohol. Sufficient chloroform to make 3600 gm. is added and the mixture stirred until dissolved. Eight gm. of polyethylene glycol 400 and 0.9 gm. of sodium saccharin are added. Five and four-tenths gm. of Indiana Red Oxide is suspended in the solution.

The coating fluid was applied by means of the air suspension machine to 2000 gm. of tablets, 9/32" half oval weighing 140 mg. each.

The following results were obtained:

Coating per tablet _____ mg__ 10.7
Thickness:
    Edge _____ inch__ .0027
    Side _____ do____ .0030

Disintegration Time: U.S.P. XV
    Coated tablet _____ minutes__ 11
    Uncoated tablet _____ do____ 4

Difference due to film _____ do____ 7

EXAMPLE 6

A coating solution is prepared from the following types and amounts of ingredients:

| | Gm. |
|---|---|
| Methylcellulose U.S.P., 10 cps. | 4 |
| Polyethylene glycol 400 | 0.5 |
| Polyethylene glycol 4000 | 0.5 |
| Chloroform | 55 |
| Water | 10 |
| Methanol | 35 |

The methylcellulose is wetted with the alcohol and then the chloroform and water added. The polyethylene glycols are added and the mixture stirred until dissolved.

The compoistion so prepared can be applied to tablets in the air suspension machine.

EXAMPLE 7

Coating compositions of the present invention are prepared from the following types and amounts of ingredients:

(A)

| | Gm. |
|---|---|
| Methylcellulose, 25 cps. | 40 |
| Polyethylene glycol 400 | 5 |
| Polyethylene glycol 4000 | 5 |
| Chloroform | 550 |
| Methanol | 350 |
| Water | 100 |

(B)

| | |
|---|---|
| Methylcellulose, 10 cps. U.S.P. | 5 |
| Polyethylene glycol 4000 | .625 |
| Methanol | 400 |
| Chloroform | 600 |

(C)

| | |
|---|---|
| Methylcellulose, 1500 cps. | 5 |
| Polyethylene glycol 200 | 5 |
| Chloroform | 600 |
| Methanol | 400 |

(D)

| | |
|---|---|
| Methylcellulose, 10 cps. U.S.P. | 9.5 |
| Polyethylene glycol 1500 | .5 |
| Chloroform | 650.0 |
| Ethanol | 350.0 |

(E)

| | |
|---|---|
| Methylcellulose, 25 cps. | 40.0 |
| Polypropylene glycol 400 | 10.0 |
| Chloroform | 550.0 |
| Methanol | 350.0 |
| Water | 100.0 |

The foregoing compositions can be applied to tablets in the air suspension machine.

EXAMPLE 8

Fifty grams of methylcellulose 10 cps. are dissolved in 1100 grams of chloroform. 37.5 grams of polyethylene glycol 6000, 6.25 grams of polytheylene glycol 4000, and 6.25 grams of polyethylene glycol 400 are dissolved in a solution of 700 grams of methanol and 200 grams of water. The two solutions are then mixed.

The solution is applied to 1000 grams of tablets rotating in the air suspension machine to form a coating.

EXAMPLE 9

A coating solution was prepared from the following types and amounts of ingredients:

| | Gm. |
|---|---|
| Methylcellulose, 50 cps. | 37.5 |
| Polyethylene glycol 4000 | 37.5 |
| F. D. and C. Yellow No. 1 | 0.1 |
| Deionized water | 10.0 |
| Chloroform | 1500.0 |
| Methanol | 1000.0 |

All of the above solution was applied to 2 kg. of tablets (3,370 tablets) in the air suspension coating machine. A sample (Part A) of the tablets was removed after 1.5 kg. of solution had been applied. Part (B) was the remaining tablets after all of the coating solution had been applied.

| Coating: | Mg. per tablet |
|---|---|
| Part (A) | 13.3 |
| Part (B) | 22.2 |

The appearance of the coating was very good and of commercial quality.

The tablets (Part B) had the following characteristics.

Disintegration:
  In water with weights (U.S.P.)—9 minutes
  In water without weights—40 minutes
  In gastric juice with weights (U.S.P.)—10.25 minutes
  In gastric juice without weights—17.5 minutes
Hardness—10 tablets:
  Low 19.2 kg.; high 24.9 kg.; average 22.1 kg.
Friability—20 tablets—0.11%
Aging at 47° C. for 30 days
  No change in appearance
  Disintegration in gastric juice with weights—9 minutes
Hardness—10 tablets
  High 24.5 kg.; low 20.8 kg.; average 22.7 kg.

EXAMPLE 10

A coating solution was prepared from the following types and amounts of ingredients:

| | Gm. |
|---|---|
| Methylcellulose, 50 cps. | 71.25 |
| Polyethylene glycol 4000 | 3.75 |
| F. D. and C. Yellow No. 1 | 0.1 |
| Deionized water | 10.0 |
| Chloroform | 1500.0 |
| Methanol | 1000.0 |

All of the solution was applied to 2 kg. of tablets (3,370 tablets) in the air suspension coating machine. A sample (Part A) of the tablets was removed after 1.5 kg. of solution had been applied. Part (B) was the remaining tablets after all of the coating solution had been applied.

| Coating: | Mg. per tablet |
|---|---|
| Part (A) | 13.3 |
| Part (B) | 22.2 |

The appearance of the coating was very good and of commercial quality.

The tablets (Part B) had the following characteristics.

Disintegration:
  In water with weights (U.S.P.)—13.25 minutes
  In water without weights—17.5 minutes
  In gastric juice with weights (U.S.P.)—12.0 minutes
  In gastric juice without weights—16.5 minutes
Hardness—10 tablets—all 25 kg.+
Friability—20 tablets—0.03%
Aging at 47° C. for 30 days
  No change in appearance
  Disintegration in gastric juice with weights—13 minutes
  Hardness—all over 28 kg.

What is claimed is:

1. In a rotating pan coating or air suspension coating process for producing a solid medicinal dosage form enclosed by a shellac free, rapidly disintegrating, pliable, protective, surface coating, wherein the rotating solid medicinal forms tend to stick together, particularly while suspended and tumbeld in a current of air when the coating composition is blown into the air suspension coating system, said coating having a characteristic rapid disintegration in gastric fluids, the step of eliminating the need for a sealing coat or final polishing coat and the tendency of the rotating solid medicinal dosage forms to stick together by forming a homogeneous coating of less than 10 mils thickness on the said dosage form with a solution consisting essentially of methylcellulose, a polyalkylene glycol having an average molecular weight of from 1000 to 9000, and a volatile solvent, wherein the ratio by weight of solutes is 12 to 19 parts of methylcellulose to 1 to 8 parts of the said polyalkylene glycol.

2. The process of claim 1 wherein the polyalkylene glycol is polyethylene glycol.

References Cited

UNITED STATES PATENTS

| | | | |
|---|---|---|---|
| 3,043,747 | 7/1962 | Long | 424—35 XR |
| 3,096,248 | 7/1963 | Rudzki | 424—35 XR |
| 3,112,220 | 11/1963 | Heiser et al. | 117—100 |
| 3,256,111 | 6/1966 | Singiser | 117—85 |
| 3,371,015 | 2/1968 | Sjogren et al. | 424—35 XR |
| 3,383,236 | 5/1968 | Brindamour | 117—100 |
| 3,431,138 | 3/1969 | Zingerman et al. | 117—100 |
| 3,476,588 | 11/1969 | Pitel | 117—100 |

OTHER REFERENCES

Golod et al., Drug and Cosm. Ind. 77(5): 620–1, 700–701, November 1955.

Gross et al., Drug and Cosm. Ind. 86(2): 170–171, 264, 288–291, February 1960.

SHEP K. ROSE, Primary Examiner

U.S. Cl. X.R.

106—203; 117—104, 105.3, 105.4; 424—35